US012798069B2

(12) United States Patent
Tsai

(10) Patent No.: US 12,798,069 B2
(45) Date of Patent: Nov. 17, 2026

(54) TOOL ASSEMBLY

(71) Applicant: Chang-Yu Tsai, Taichung City (TW)

(72) Inventor: Chang-Yu Tsai, Taichung City (TW)

( * ) Notice: Subject to any disclaimer, the term of this patent is extended or adjusted under 35 U.S.C. 154(b) by 196 days.

(21) Appl. No.: 19/001,549

(22) Filed: Dec. 25, 2024

(65) Prior Publication Data

US 2026/0175391 A1 Jun. 25, 2026

(51) Int. Cl.
*B25F 1/04* (2006.01)
*B25B 15/00* (2006.01)

(52) U.S. Cl.
CPC .............. *B25F 1/04* (2013.01); *B25B 15/008* (2013.01)

(58) Field of Classification Search
CPC .... B25F 1/00; B25F 1/02; B25F 1/003; B25F 1/04; B25G 1/002; B25G 1/005; B25G 1/04; B25G 1/06; B25G 1/08; B25B 15/008
USPC ........... 81/177.4, 440, 436, 439; 7/118, 138, 7/165, 168
See application file for complete search history.

(56) References Cited

U.S. PATENT DOCUMENTS 8,490,523 B2 7/2013 Tsai
2011/0289693 A1* 12/2011 Tsai .......................... B25F 1/04 7/118
2017/0120434 A1* 5/2017 Tsai .......................... B25F 1/04

* cited by examiner

*Primary Examiner* — Brian D Keller
*Assistant Examiner* — Alberto Saenz
(74) *Attorney, Agent, or Firm* — Justin Lampel

(57) ABSTRACT

A tool assembly includes a first body, two positioning plates, multiple rotational members, multiple hand tools, two elastic members, a second body unit, and two control units. The first body has two first pivot portions, multiple receiving spaces, and two first control grooves. Each of the positioning plates has two second pivot portions and two second control grooves. Each of the rotational members has a third pivot portion and multiple first locking portions. Each of the hand tools has a fourth pivot portion. The second body unit includes two second bodies and two connecting members. Each of the second bodies has two fifth pivot portions, two third control grooves, and a limit portion. Each of the control units includes a control lever, a pin, a control member, and a fixing member. The control lever has a second locking portion and a passage.

10 Claims, 17 Drawing Sheets

TOOL ASSEMBLY

BACKGROUND OF THE INVENTION

Field of the Invention

The present invention relates to a tool assembly and, more particularly, to a foldable tool assembly.

Description of the Related Art

A conventional lockable folding multi-tool was disclosed in the U.S. Pat. No. 8,490,523, and comprises a separator 60, a grip material 25, multiple lock engaging members 81, multiple work tools 32, two supports 50, two lock members 90, and two push buttons 100. Each of the lock members 90 has multiple circumferential grooves 92 for receiving the work tools 32.

However, the conventional tool assembly has the following disadvantages.

1. With reference to FIG. 7, each of the lock members 90 has a cylindrical shape and is movable on the separator 60 to lock or unlock the work tools 32. The work tools 32 have different specifications and different width so that different spacings are defined between the work tools 32. The circumferential grooves 92 have to fit the width of the work tools 32 so that the circumferential grooves 92 have different spacings. Thus, the circumferential grooves 92 are worked to have different positions to correspond to the work tools 32, thereby complicating the working process.

2. With reference to FIG. 2, the positions of the circumferential grooves 92 have to fit the work tools 32 mounted in the separator 60, so that the circumferential grooves 92 of the two lock members 90 have different positions. Thus, the conventional tool assembly has two lock members 90 that have different spacings for fitting the work tools 32 of different spacings, so that when one of the work tools 32 has to be replaced, it is necessary to replace a respective one of the two lock members 90.

3. The two lock members 90 are pressed on the separator 60 to lock or unlock the work tools 32. At this time, the two lock members 90 are pressed from a single side of the separator 60 and cannot be pressed from two sides of the separator 60. Thus, when the user holds the tool assembly in a different direction, the user's finger cannot touch the two lock members 90 so that it is necessary to turn the separator 60 to facilitate the user pressing the two lock members 90, thereby causing inconvenience to the user.

A conventional tool locking mechanism was disclosed in the U.S. Pat. No. 6,868,760, and comprises a housing 12, two shafts 28, and multiple tools 60. Each of the two shafts 28 is moved axially on the housing 12 to control the tools 60 so that the tools 60 are locked or unlocked.

BRIEF SUMMARY OF THE INVENTION

In accordance with the present invention, there is provided a tool assembly comprising a first body, two positioning plates, multiple rotational members, multiple hand tools, two elastic members, a second body unit, and two control units. The first body is provided with two first pivot portions, multiple receiving spaces, two first control grooves, two projections, two breaches, and two first pivoting sections. Each of the two positioning plates is provided with two second pivot portions, two second control grooves, and a first slot. Each of the rotational members is provided with a third pivot portion, multiple first locking portions, and a receiving groove. Each of the hand tools is provided with a fourth pivot portion and an operation end. The second body unit includes two second bodies and two connecting members. Each of the two second bodies is provided with two fifth pivot portions, two third control grooves, a limit portion, a recess, and a second slot. Each of the two control units includes a control lever, a pin, a control member, and a fixing member. The control lever is provided with a second locking portion and a passage.

According to the primary advantage of the present invention, each of the two control units is rotated to control the locked state or the unlocked state. Thus, each of the two control units only needs to provide the second locking portion and the passage. The control lever of each of the two control units has the same structure when the hand tools have different specifications and sizes, and when the rotational members have different spacings or intervals. When the too assembly has two control units, each of the two control units has the same structure. Thus, it is unnecessary to change the structure of the two control units when one of the hand tools needs to be replaced.

According to another advantage of the present invention, each of the two control units is rotated to control the locked state or the unlocked state. Thus, the control member of each of the two control units protrudes from one of the two second bodies of the second body unit, so that each of the two control units is driven from one side of the second body unit. Alternatively, the two control members of each of the two control units protrude from the two second bodies of the second body unit, so that each of the two control units is driven from two sides of the second body unit. In such a manner, each of the two control units is controlled and operated from one side of the second body unitor from two sides of the second body unit. In addition, the switch knob is touched and held by the user's finger to facilitate the user manipulating each of the two control units.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
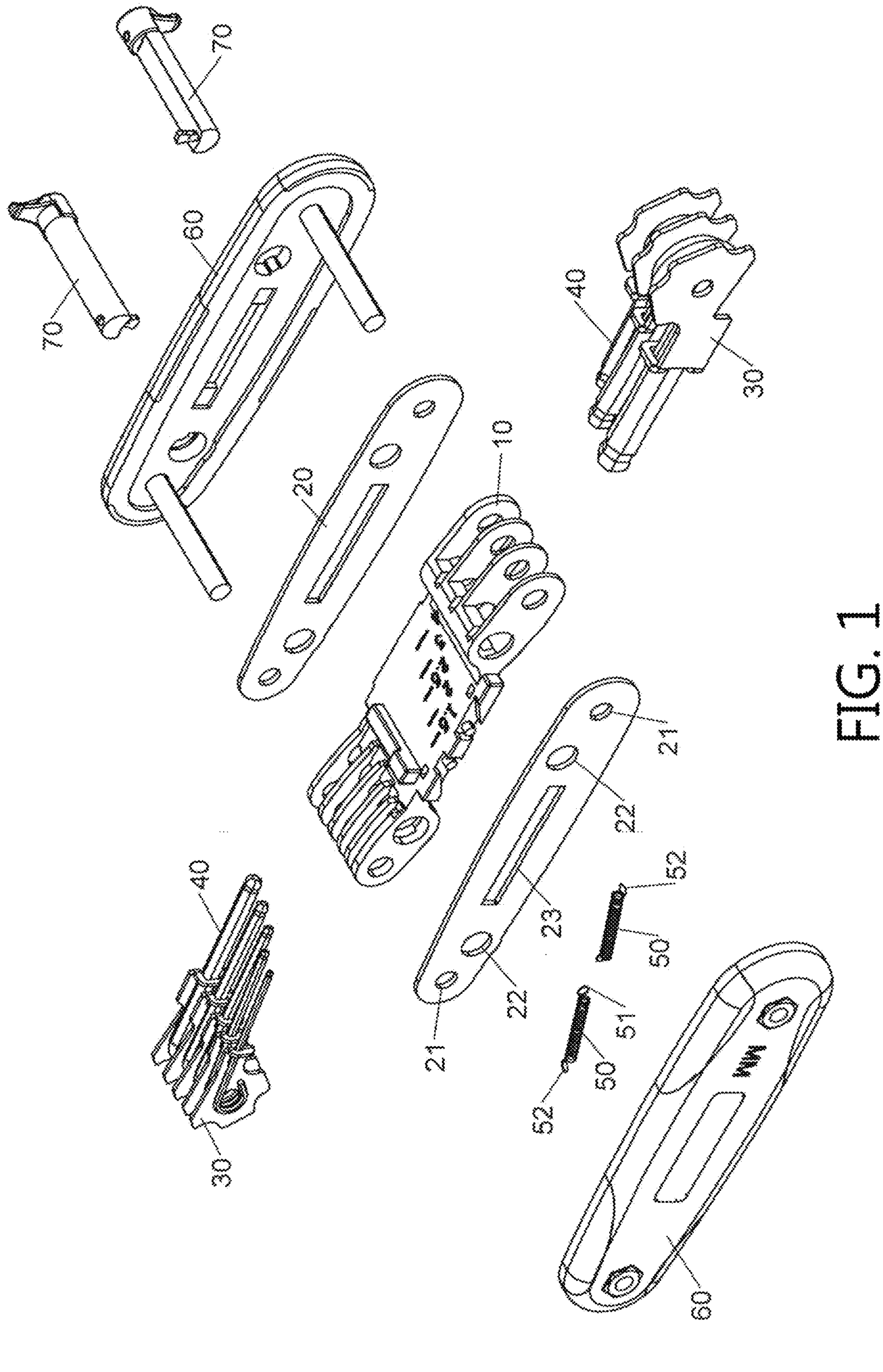
FIG. 1 is an exploded perspective view of a tool assembly in accordance with the preferred embodiment of the present invention.
Figure 2:
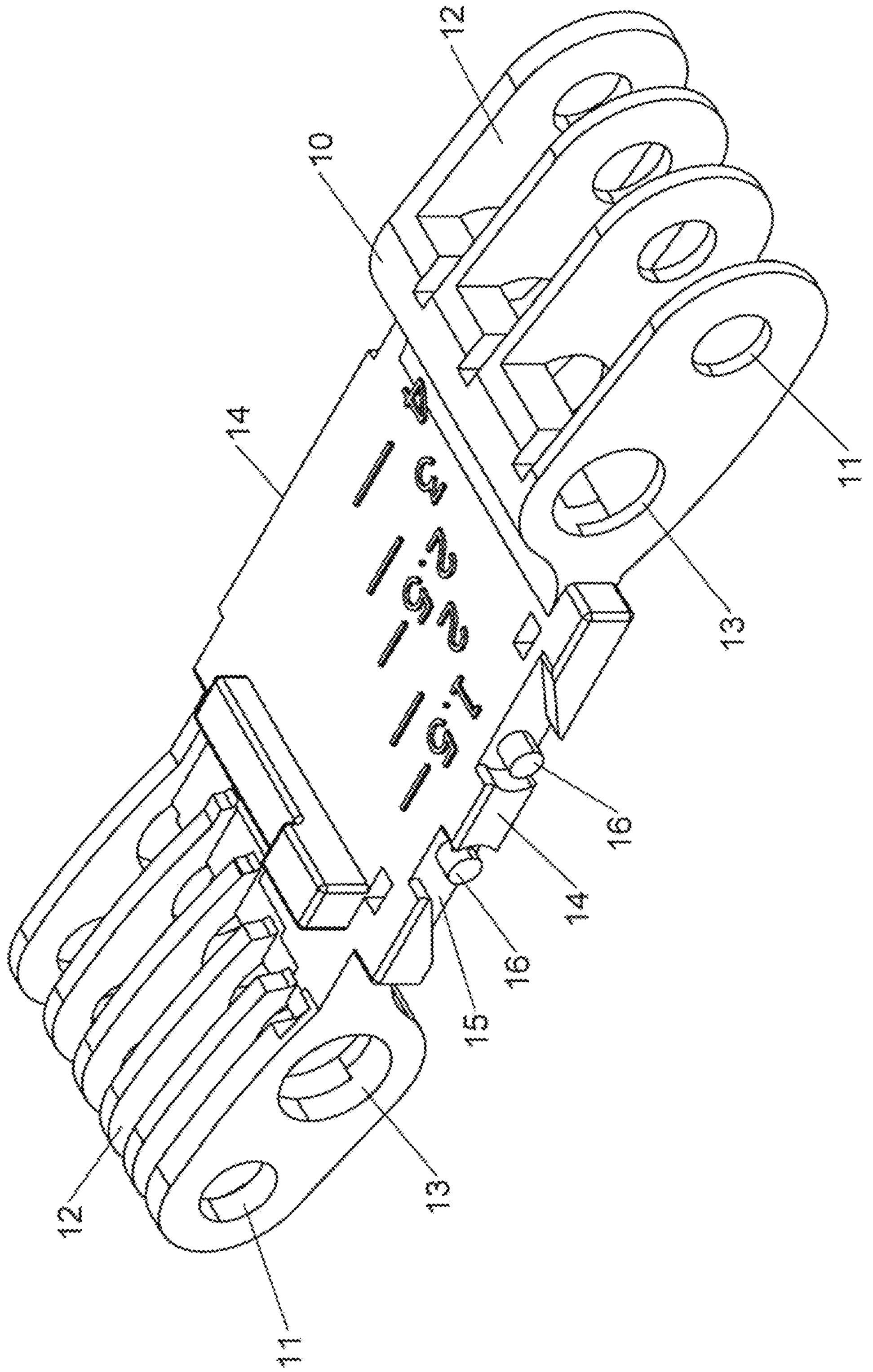
FIG. 2 is a perspective view of a first body of the tool assembly in accordance with the preferred embodiment of the present invention.
Figure 3:
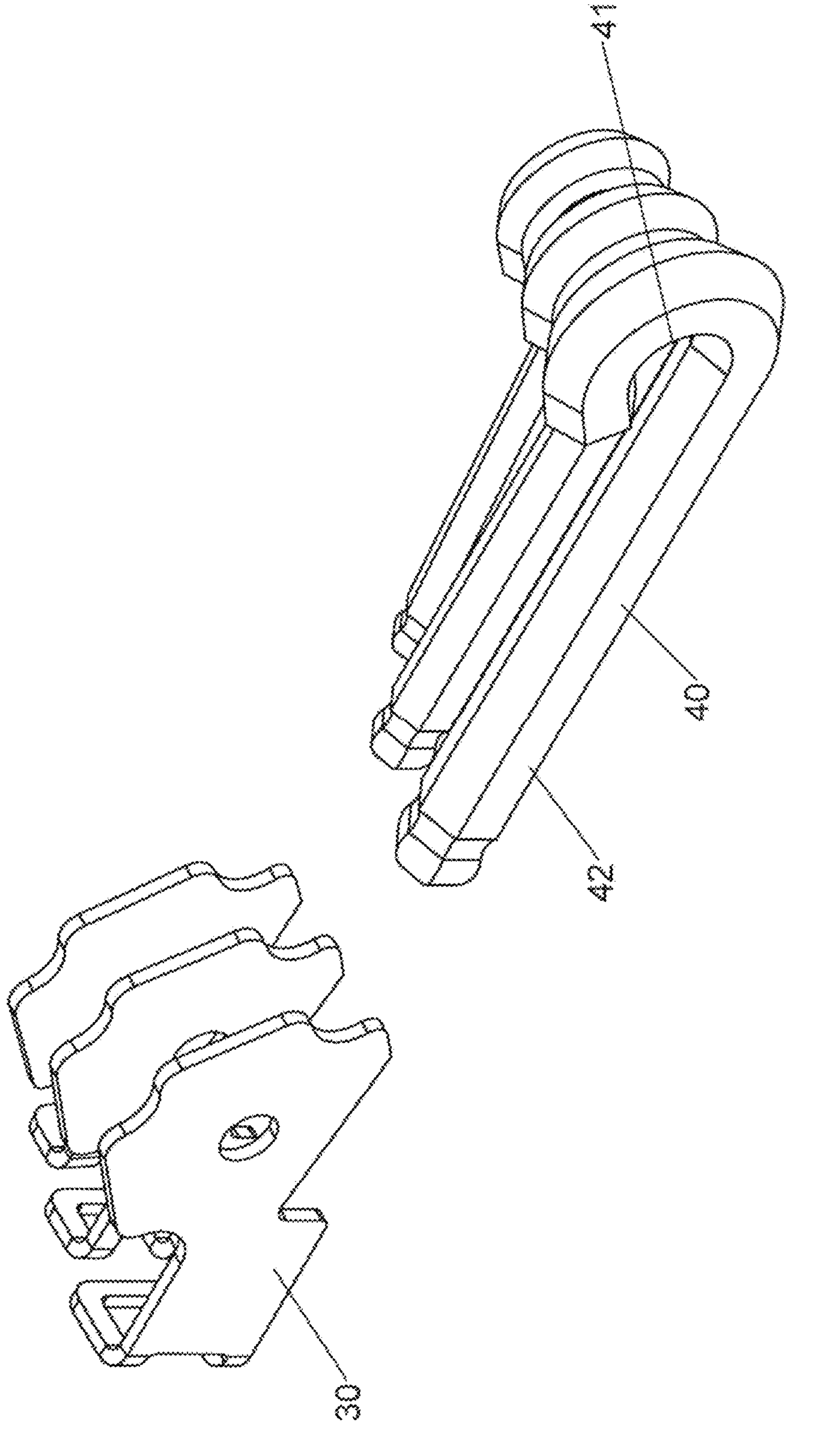
FIG. 3 is a perspective view showing multiple rotational members and multiple hand tools of the tool assembly in accordance with the preferred embodiment of the present invention.
Figure 4:
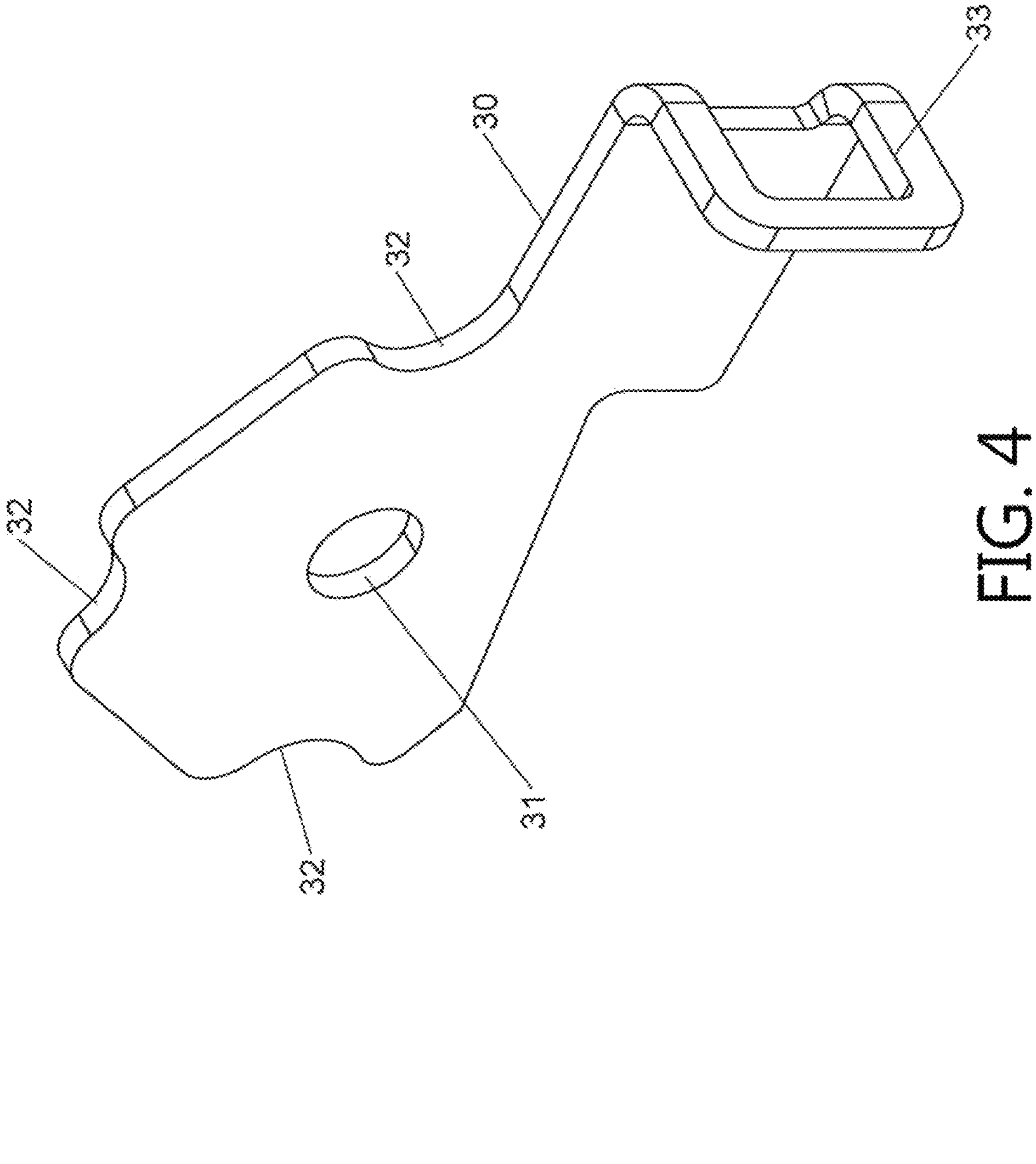
FIG. 4 is a perspective view of a rotational member of the tool assembly in accordance with the preferred embodiment of the present invention.
Figure 5:
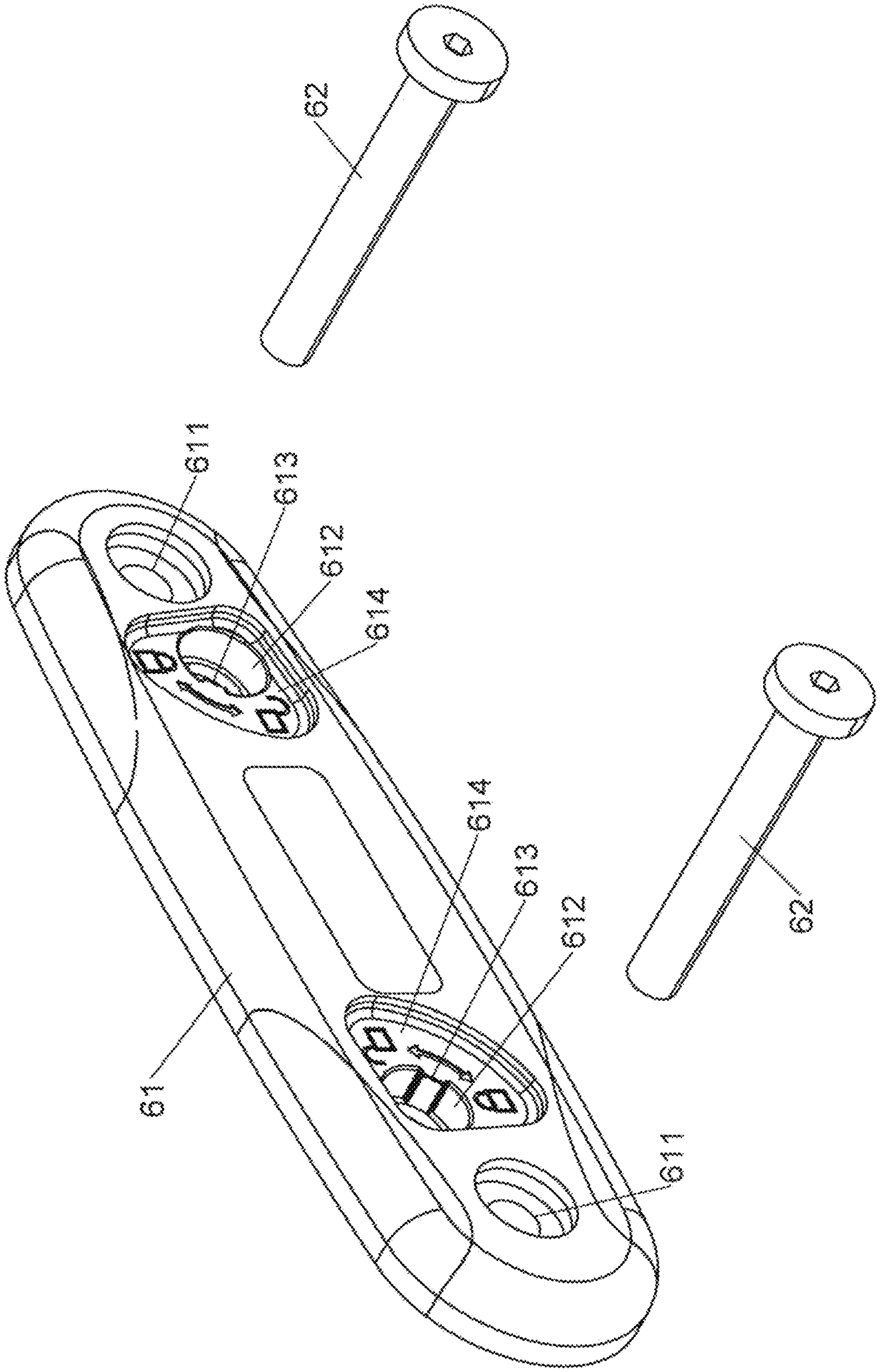
FIG. 5 is an exploded perspective view of a second body unit of the tool assembly in accordance with the preferred embodiment of the present invention.
Figure 6:
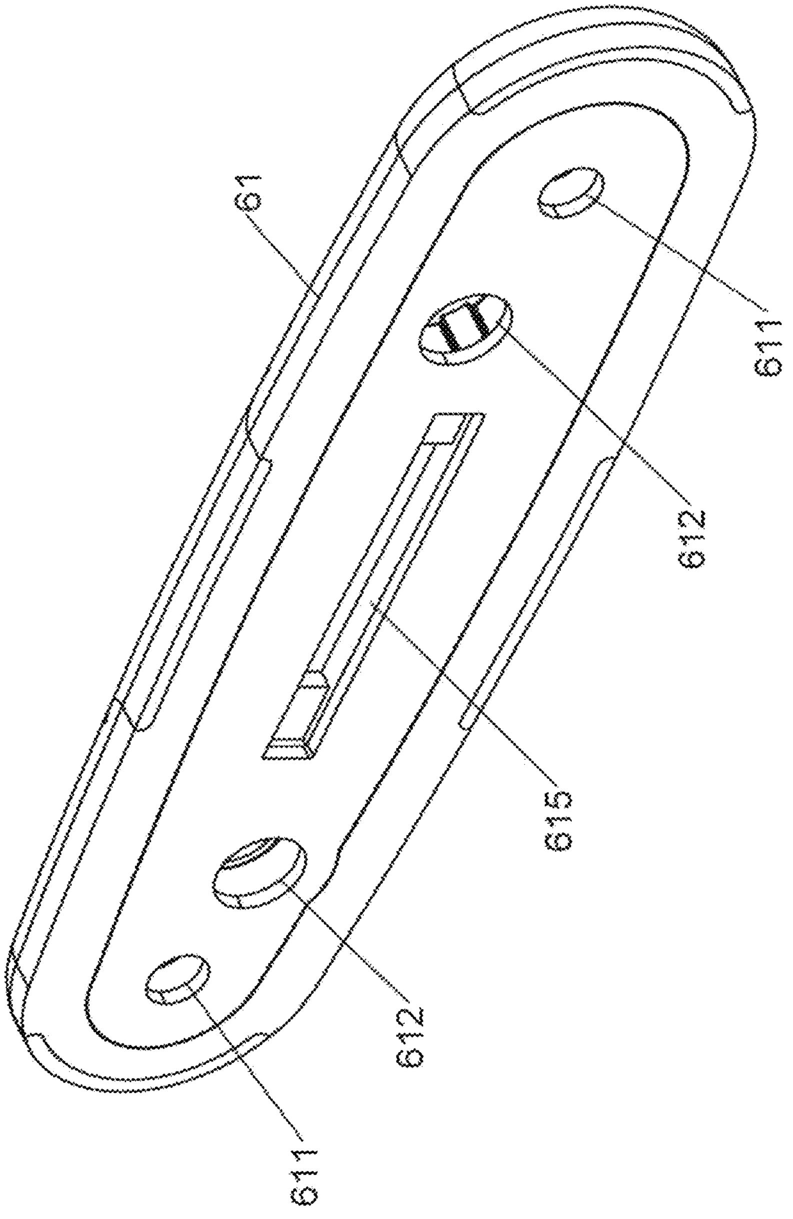
FIG. 6 is a perspective view of a second body of the tool assembly in accordance with the preferred embodiment of the present invention.
Figure 7:
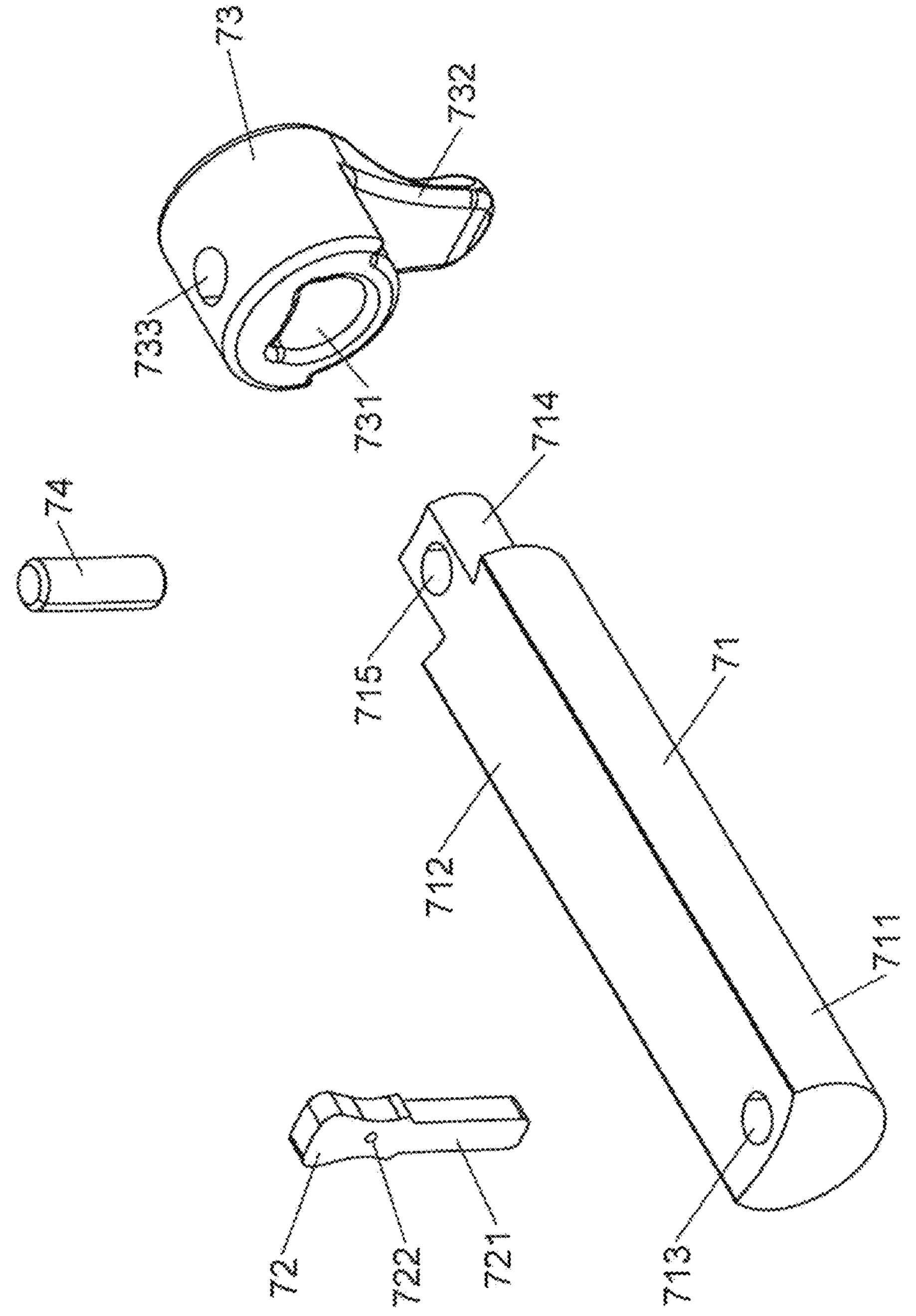
FIG. 7 is an exploded perspective view of a control unit of the tool assembly in accordance with the preferred embodiment of the present invention.

Referring to the drawings and initially to FIGS. 1-10, a tool assembly in accordance with the preferred embodiment of the present invention comprises a first body 10, two positioning plates 20, multiple rotational members 30, multiple hand tools 40, two elastic members 50, a second body unit 60, and two control units 70.

The first body 10 has two first pivot portions 11 provided on two ends thereof. Each of the two first pivot portions 11 has a circular through hole. Each of the two first pivot portions 11 is provided with multiple receiving spaces 12 arranged linearly. The first body 10 has two first control grooves 13 provided on the two ends thereof. Each of the two first control grooves 13 is a circular through hole. The two first control grooves 13 are disposed between the two first pivot portions 11. Each of the two first control grooves 13 has an axis parallel with that of each of the two first pivot portions 11. The first body 10 has two projections 14 provided on two sides thereof. One of the two projections 14 is provided with two breaches 15 and two first pivoting sections 16. Each of the two first pivoting sections 16 is provided in one of the two breaches 15. Each of the two first pivoting sections 16 is a cylinder (or pillar).

Figure 9:
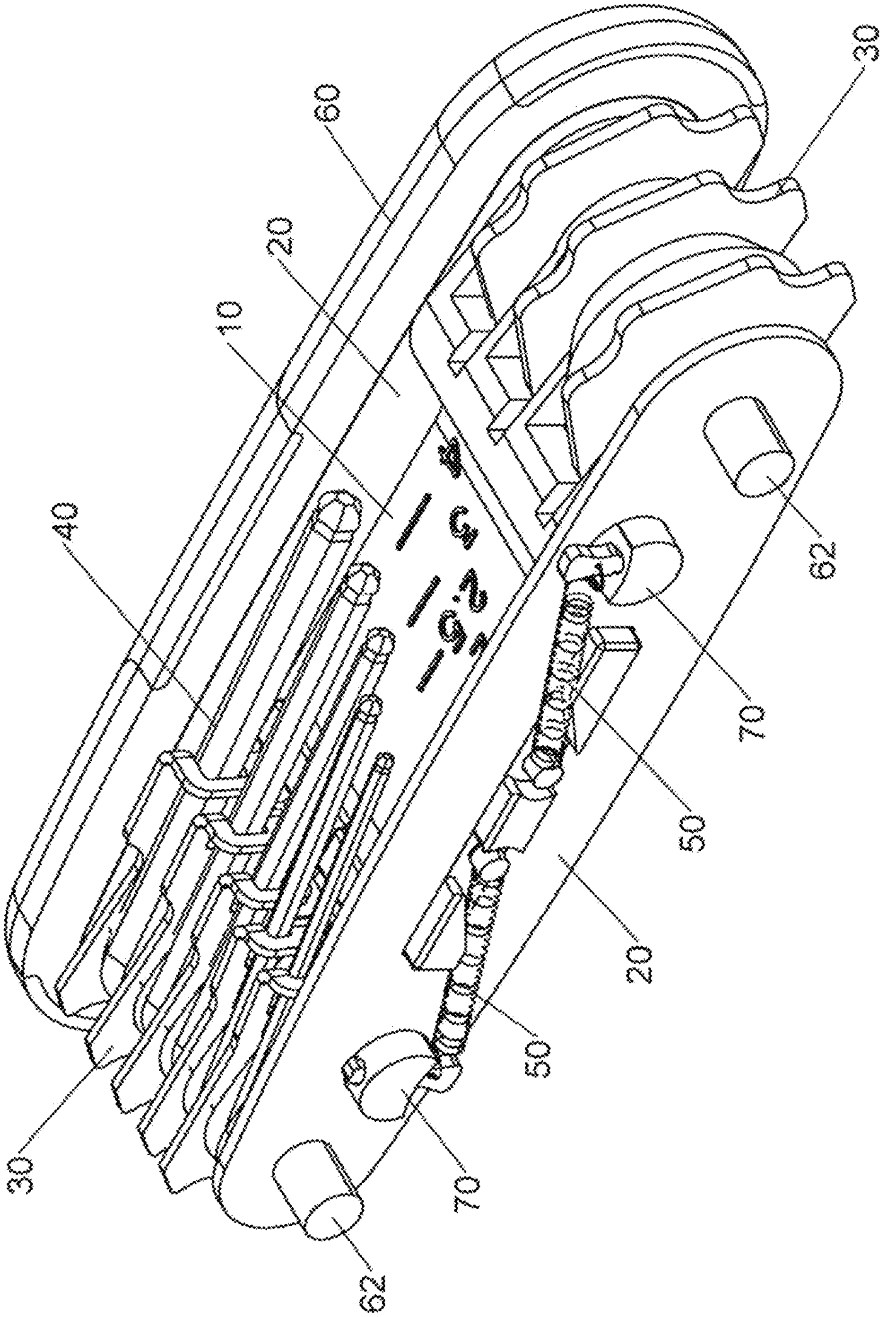
FIG. 9 is another partial perspective view of the tool assembly in accordance with the preferred embodiment of the present invention.

Each of the two positioning plates 20 is a sheet plate. The two positioning plates 20 are mounted on the two sides of the first body 10 respectively. The two positioning plates 20 are arranged symmetrically relative to the first body 10. Each of the two positioning plates 20 has two second pivot portions 21 provided on two ends thereof. The two second pivot portions 21 align with the two first pivot portions 11 respectively. Each of the two positioning plates 20 has two second control grooves 22 provided on the two ends thereof. The two second control grooves 22 align with the two first control grooves 13 respectively. Each of the two positioning plates 20 has a middle provided with a first slot 23 mounted on one of the two projections 14, with the two breaches 15 and the two first pivoting sections 16 protruding from the first slot 23 as shown in FIG. 9. The first slot 23 has an elongate shape with a transverse opening.

Each of the rotational members 30 is pivotally mounted in each of the receiving spaces 12 and is rotatable in one of the receiving spaces 12. Each of the rotational members 30 is provided with a third pivot portion 31 aligning with one of the two first pivot portions 11 and one of the two second pivot portions 21. The third pivot portion 31 is a circular hole. Each of the rotational members 30 is provided with multiple first locking portions 32. One of the first locking portions 32 aligns with one of the two first control grooves 13 and one of the two second control grooves 22. The first locking portions 32 are arranged annularly about an axis of the third pivot portion 31. Each of the first locking portions 32 is a concave groove. Preferably, each of the rotational members 30 is provided with three first locking portions 32. Each of the rotational members 30 has an end provided with a receiving groove 33. The receiving groove 33 has a rectangular shape. Preferably, each of the rotational members 30 is a sheet plate, and the receiving groove 33 is formed by bending each of the rotational members 30.

Each of the hand tools 40 is mounted on each of the rotational members 30. Each of the hand tools 40 and each of the rotational members 30 are pivotally mounted in each of the receiving spaces 12. Each of the hand tools 40 and each of the rotational members 30 are rotated about one of the two first pivot portions 11 through an angle. Each of the hand tools 40 is provided with a fourth pivot portion 41 aligning with one of the two first pivot portions 11, one of the two second pivot portions 21, and the third pivot portion 31. Each of the hand tools 40 is provided with an operation (or action) end 42 extending through and received in the receiving groove 33, so that each of the hand tools 40 is driven and rotated by each of the rotational members 30. Preferably, each of the hand tools 40 is a hex wrench having a 9-shaped profile.

Each of the two elastic members 50 is a spring and is partially received in one of the two breaches 15. Each of the two elastic members 50 has a first end 51 and a second end 52. The first end 51 of each of the two elastic members 50 is mounted on one of the two first pivoting sections 16.

The second body unit 60 is mounted outside of the two positioning plates 20, with each of the two positioning plates 20 being located between the first body 10 and the second body unit 60. The second body unit 60 includes two second bodies 61 and two connecting (or fastening) members 62.

The two second bodies 61 are mounted on the two positioning plates 20 respectively. Each of the two second bodies 61 has two fifth pivot portions 611 provided on two ends thereof. Each of the two fifth pivot portions 611 aligns with one of the two first pivot portions 11, one of the two second pivot portions 21, the third pivot portion 31, and the fourth pivot portion 41. Each of the two second bodies 61 has two third control grooves 612 provided on the two ends thereof. The two third control grooves 612 align with the two first control grooves 13 and the two second control grooves 22 respectively. Each of the two third control grooves 612 has an interior provided with a limit (or restriction) portion 613. The limit portion 613 is a protruding block. Each of the two third control grooves 612 has a side provided with a recess 614. The recess 614 has a dimension more than that of each of the two third control grooves 612. The recess 614 is provided with markings for indicating a locked state or an unlocked state. Each of the two second bodies 61 has a middle provided with a second slot 615 aligning with the first slot 23. The second slot 615 is mounted on one of the two projections 14.

Each of the two connecting members 62 extends through one of the two fifth pivot portions 611, one of the two second pivot portions 21, one of the two first pivot portions 11, the third pivot portion 31, and the fourth pivot portion 41, so that the first body 10, the two positioning plates 20, the rotational members 30, the hand tools 40, and the second body unit 60 are assembled. Preferably, each of the two connecting members 62 is a bolt, and the second body unit 60 further includes two nuts mounted in the two fifth pivot portions 611 of one of the two second bodies 61 and screwed onto the two connecting members 62.

The two control units 70 are pivotally mounted in the two first control grooves 13, the two second control grooves 22, and the two third control grooves 612 respectively. Each of the two control units 70 controls the rotational members 30 and the hand tools 40 to move relative to the first body 10 between a locked state and an unlocked state. Each of the two control units 70 is restricted by the limit portion 613 so that each of the two control units 70 cannot be rotated in one of the two third control grooves 612 through three hundred and sixty degrees (360°).

Each of the two control units 70 includes a control lever (or rod) 71, a pin (or tip or plug) 72, a control (or drive) member 73, and a fixing (or fastening) member 74.

The control lever 71 passes through one of the two third control grooves 612, one of the two second control grooves 22, and one of the two first control grooves 13. The control lever 71 is rotatable in one of the two third control grooves 612, with the limit portion 613 restraining a rotation angle of the control lever 71. The control lever 71 is provided with a second locking portion 711 locked on one of the first locking portions 32. The second locking portion 711 has an arcuate face. The control lever 71 is provided with a passage 712 allowing passage of the rotational members 30. The passage 712 is located opposite to the second locking portion 711 and has a concave face. The second locking portion 711 and the passage 712 extend in a lengthwise direction of the control lever 71. The control lever 71 has a first end provided with a first through hole 713. The first through hole 713 is a circular hole penetrating the control lever 71. The first through hole 713 is perpendicular to an axis of the control lever 71. The control lever 71 has a second end provided with a first connecting portion 714. The first connecting portion 714 extends a shape of the control lever 71 and has a semi-cylindrical shape. The first connecting portion 714 is provided with a first fixed portion 715. The first fixed portion 715 is a circular hole and is perpendicular to the axis of the control lever 71.

The pin 72 is assembled with the control lever 71. The pin 72 has an end provided with a shank 721 assembled in the first through hole 713. The shank 721 as a width less than that of the pin 72. The pin 72 is provided with a second pivoting section 722 protruding from the first through hole 713. The second end 52 of each of the two elastic members 50 is mounted on the second pivoting section 722. The control lever 71 and the pin 72 are rotated so that each of the two elastic members 50 stores a restoring force. The second pivoting section 722 is a hole.

The control member 73 protrudes from the second body unit 60 and is assembled with the control lever 71. The control member 73 is provided with a second connecting portion 731 mounted on the first connecting portion 714. The second connecting portion 731 is a semi-circular recess. The control member 73 is provided with a switch (or drive) knob 732 protruding therefrom. The switch knob 732 is received in the recess 614. The control member 73 is provided with a second fixed portion 733 aligning with the first fixed portion 715. The second fixed portion 733 is a through hole connected to the second connecting portion 731. The second fixed portion 733 is perpendicular to the second connecting portion 731. Thus, when the switch knob 732 is rotated in the recess 614, the control member 73 is rotated to drive the control lever 71, and the control lever 71 is rotated in one of the two third control grooves 612, one of the two second control grooves 22, and one of the two first control grooves 13.

The fixing member 74 passes through the second fixed portion 733 and the first fixed portion 715, so that the control member 73 and the control lever 71 are assembled by the fixing member 74. Preferably, the fixing member 74 is a circular rod.

In practice, when the control lever 71 is driven by one of the two elastic members 50 to reach a first position or a locked state, the second locking portion 711 restricts one of the first locking portions 32, so that the rotational members 30 and the hand tools 40 are locked and cannot be rotated. When the control lever 71 is driven by the switch knob 732, which is driven by the user, to reach a second position or an unlocked state, the passage 712 is moved to align with and release one of the first locking portions 32, and the rotational members 30 are allowed to pass the passage 712, so that the rotational members 30 and the hand tools 40 are unlocked and can be rotated freely. After the switch knob 732 is released, the control lever 71 is driven by the restoring force of one of the two elastic members 50 and returned to the first position or the locked state.

Figure 8:
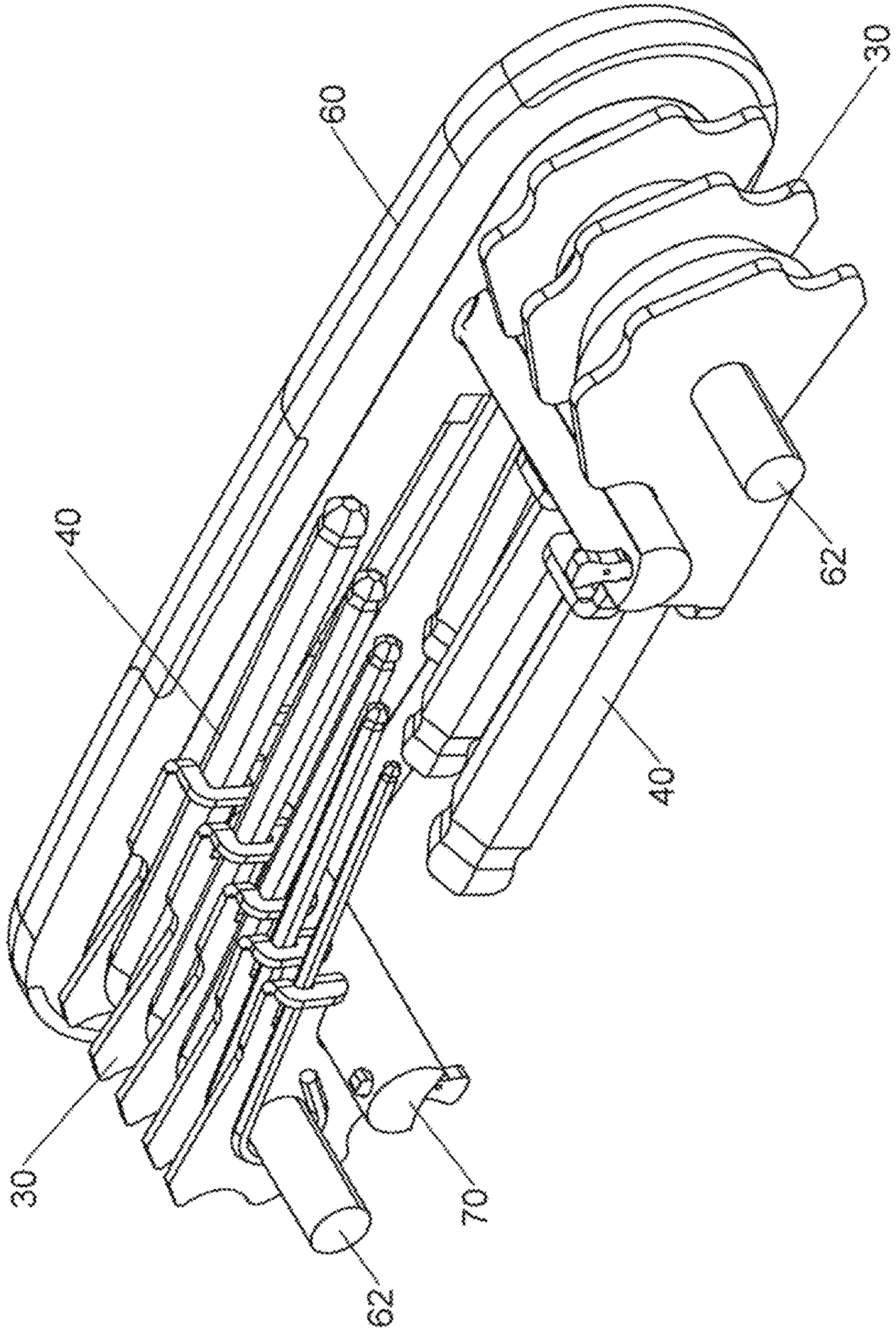
FIG. 8 is a partial perspective view of the tool assembly in accordance with the preferred embodiment of the present invention.
Figure 10:
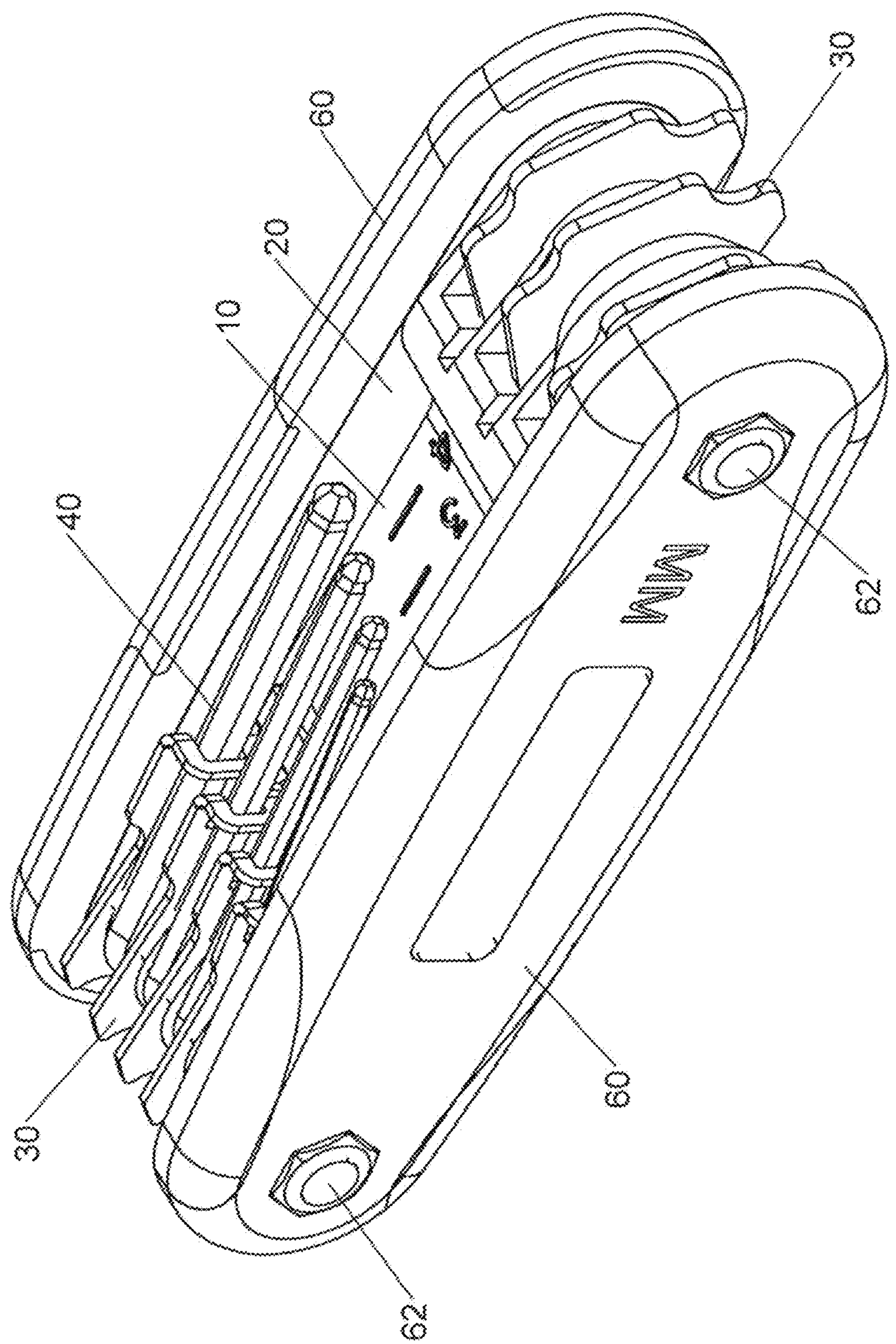
FIG. 10 is a perspective view of the tool assembly in accordance with the preferred embodiment of the present invention.

Referring to FIGS. 8-10 with reference to FIGS. 1-7, the two positioning plates 20 are mounted on the two sides of the first body 10 respectively. Each of the hand tools 40 is assembled with each of the rotational members 30. Each of the hand tools 40 and each of the rotational members 30 are pivotally mounted in each of the receiving spaces 12. The first end 51 of each of the two elastic members 50 is mounted or hooked on one of the two first pivoting sections 16. Each of the two second bodies 61 of the second body unit 60 is mounted on an outside of one of the two positioning plates 20 respectively. Each of the two connecting members 62 extends through one of the two fifth pivot portions 611, one of the two second pivot portions 21, one of the two first pivot portions 11, the third pivot portion 31, and the fourth pivot portion 41. The control lever 71 of each of the two control units 70 passes through one of the two third control grooves 612, one of the two second control grooves 22, and one of the two first control grooves 13. The second end 52 of each of the two elastic members 50 is mounted or hooked on the second pivoting section 722 to provide a restoring effect to each of the two control units 70.

Figure 11:
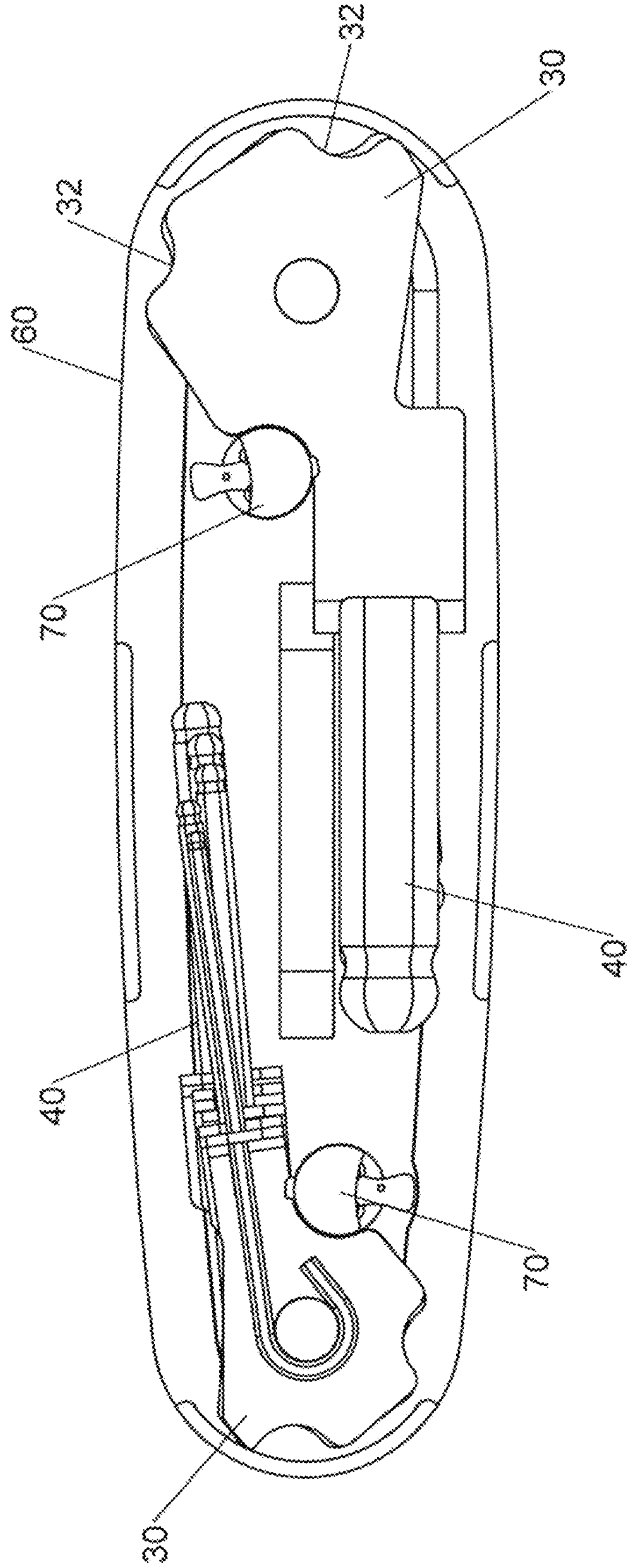
FIG. 11 is a schematic view showing a first operational state of the tool assembly in accordance with the preferred embodiment of the present invention.
Figure 12:
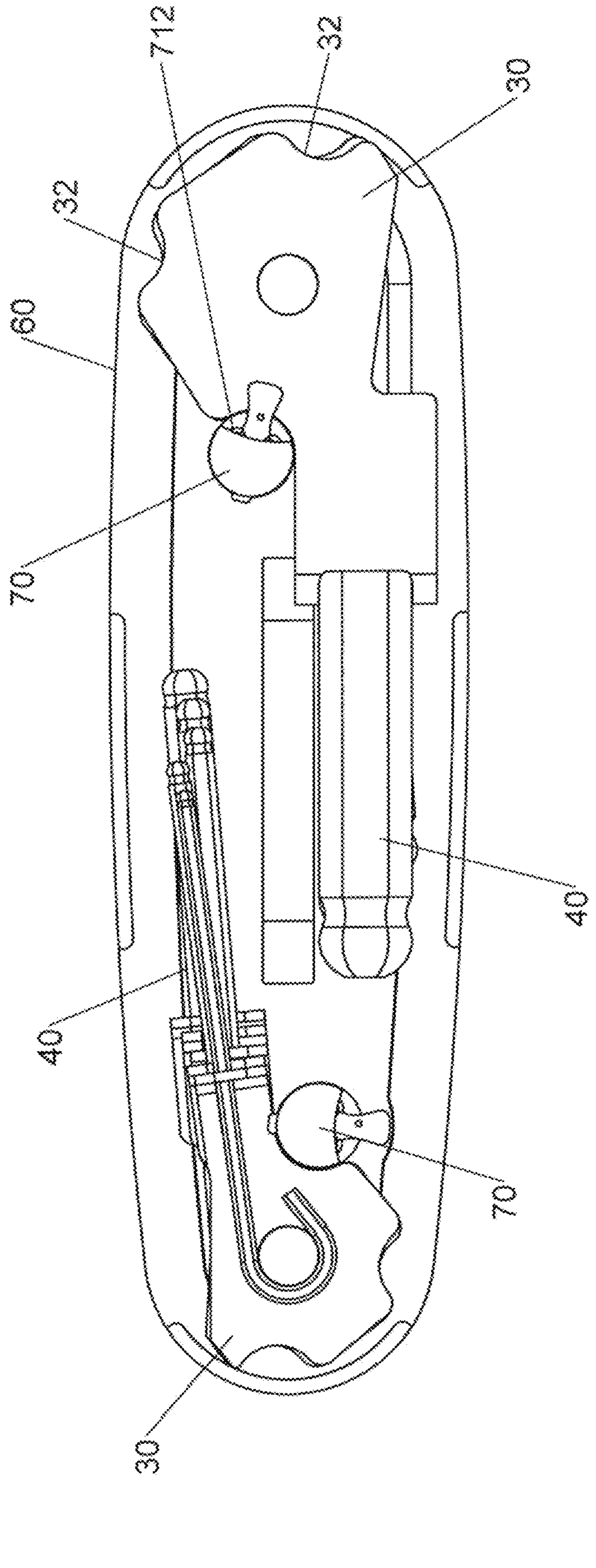
FIG. 12 is a schematic view showing a second operational state of the tool assembly in accordance with the preferred embodiment of the present invention.
Figure 13:
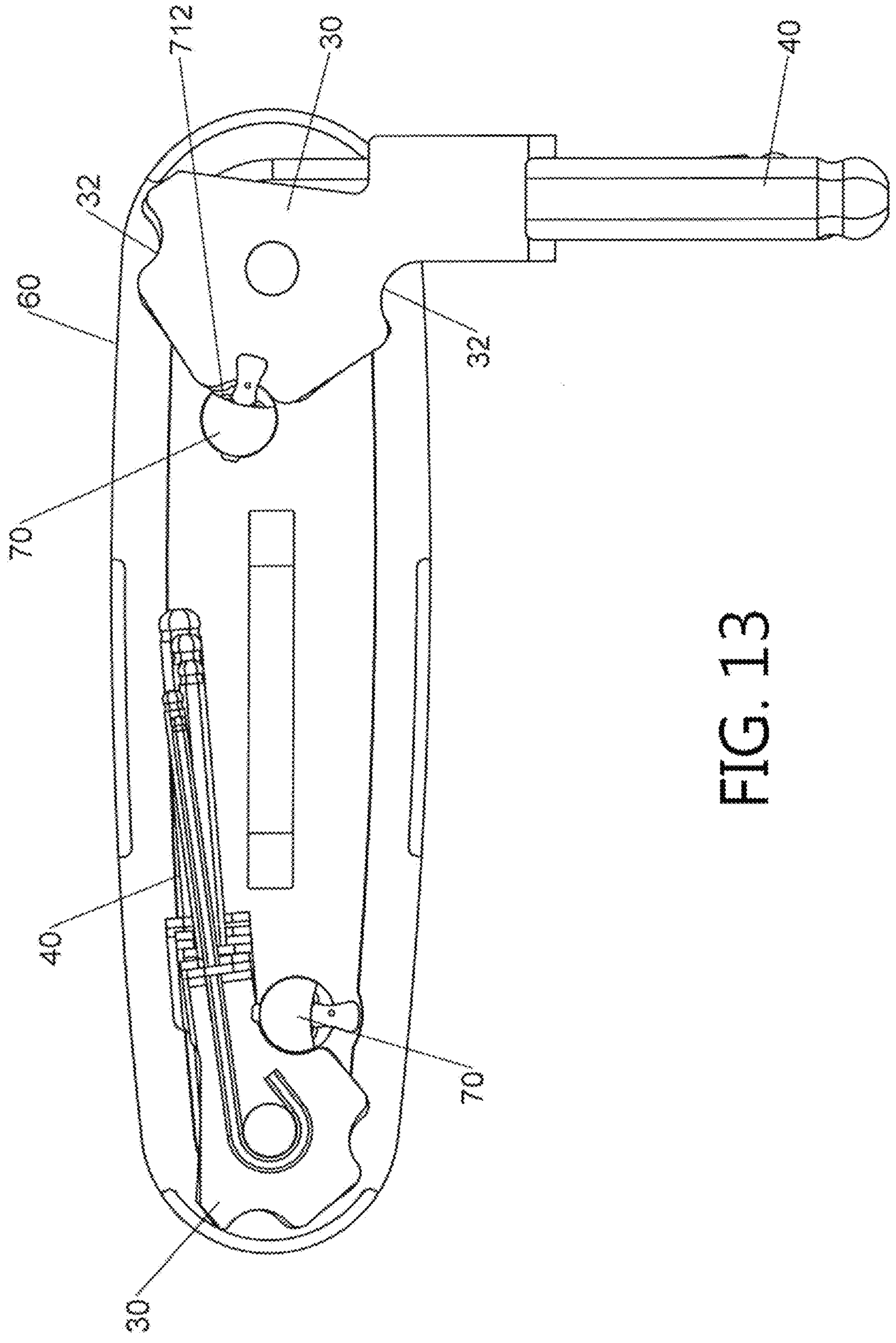
FIG. 13 is a schematic view showing a third operational state of the tool assembly in accordance with the preferred embodiment of the present invention.
Figure 14:
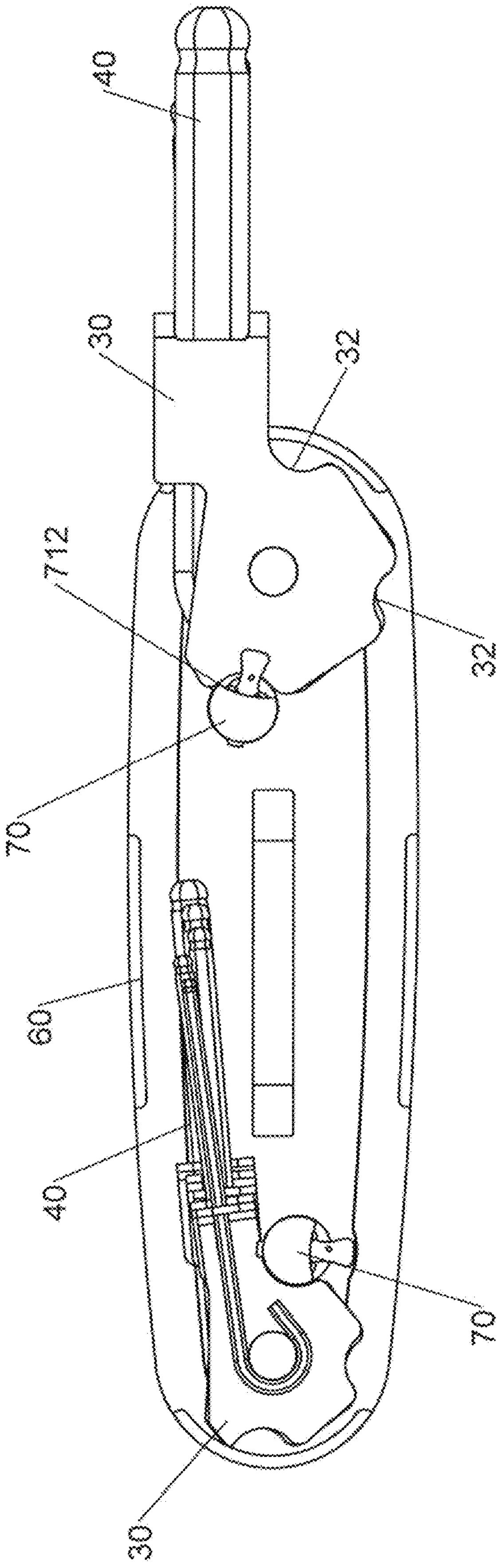
FIG. 14 is a schematic view showing a fourth operational state of the tool assembly in accordance with the preferred embodiment of the present invention.
Figure 15:
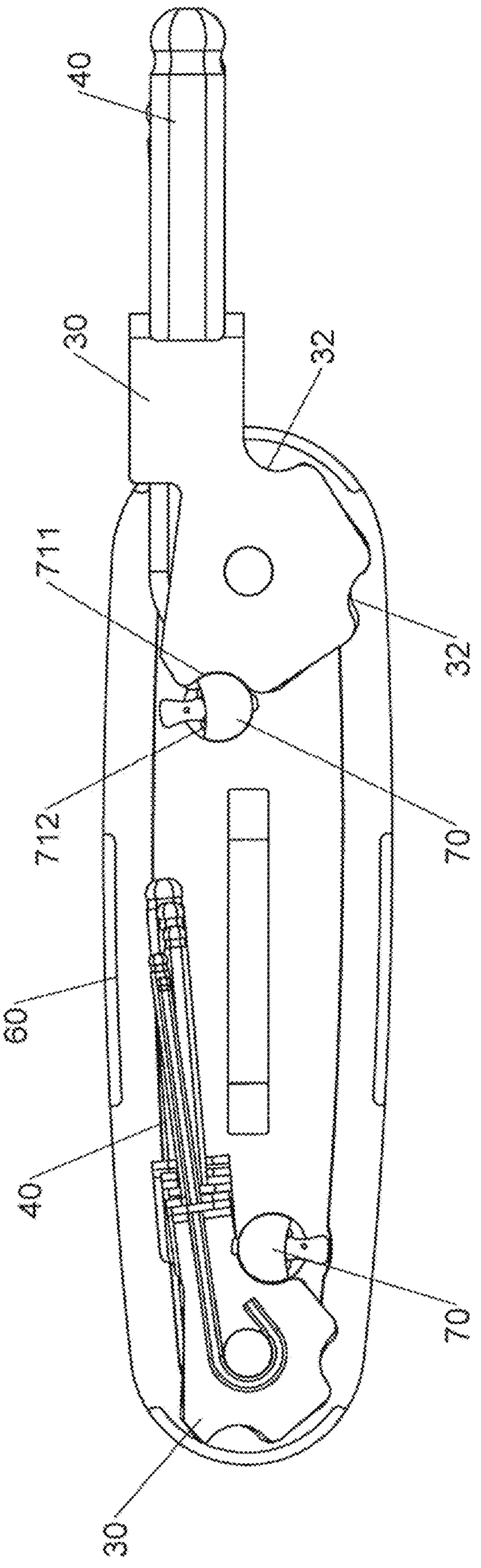
FIG. 15 is a schematic view showing a fifth operational state of the tool assembly in accordance with the preferred embodiment of the present invention.

Referring to FIGS. 11-15 with reference to FIGS. 1-10, when the control lever 71 of each of the two control units 70 is driven by one of the two elastic members 50 to reach the first position or the locked state, the second locking portion 711 is locked on a first one of the first locking portions 32, so that the rotational members 30 and the hand tools 40 are locked and cannot be rotated. At this time, the rotational members 30 and the hand tools 40 are folded into the first body 10 as shown in FIG. 11. When the control lever 71 is driven by the switch knob 732 to reach the second position or the unlocked state, the second locking portion 711 is unlocked from the first one of the first locking portions 32, and the passage 712 is moved to align with the first one of the first locking portions 32 as shown in FIG. 12, so that the first one of the first locking portions 32 is allowed to pass the passage 712. Thus, the rotational members 30 are allowed to pass the passage 712, so that the rotational members 30 and the hand tools 40 are unlocked and can be rotated freely. Then, the rotational members 30 and the hand tools 40 are rotated relative to the two first pivot portions 11 and are moved to protrude from the receiving spaces 12. When the hand tools 40 are perpendicular to the first body 10 as shown in FIG. 13, a second one of the first locking portions 32 aligns with the passage 712. Then, the rotational members 30 and the hand tools 40 are further rotated relative to the two first pivot portions 11, so that the second one of the first locking portions 32 is allowed to pass the passage 712. When the hand tools 40 are parallel with and fully extended from the first body 10 as shown in FIG. 14, a third one of the first locking portions 32 aligns with the passage 712. After the switch knob 732 is released from the user, the control lever 71 of each of the two control units 70 is driven by the restoring force of one of the two elastic members 50 to return to the first position or the locked state, and the second locking portion 711 is locked on the third one of the first locking portions 32 as shown in FIG. 15, so that the rotational members 30 and the hand tools 40 are locked and cannot be rotated. At this time, the rotational members 30 and the hand tools 40 are fully extended from the first body 10 as shown in FIG. 15.

Figure 16:
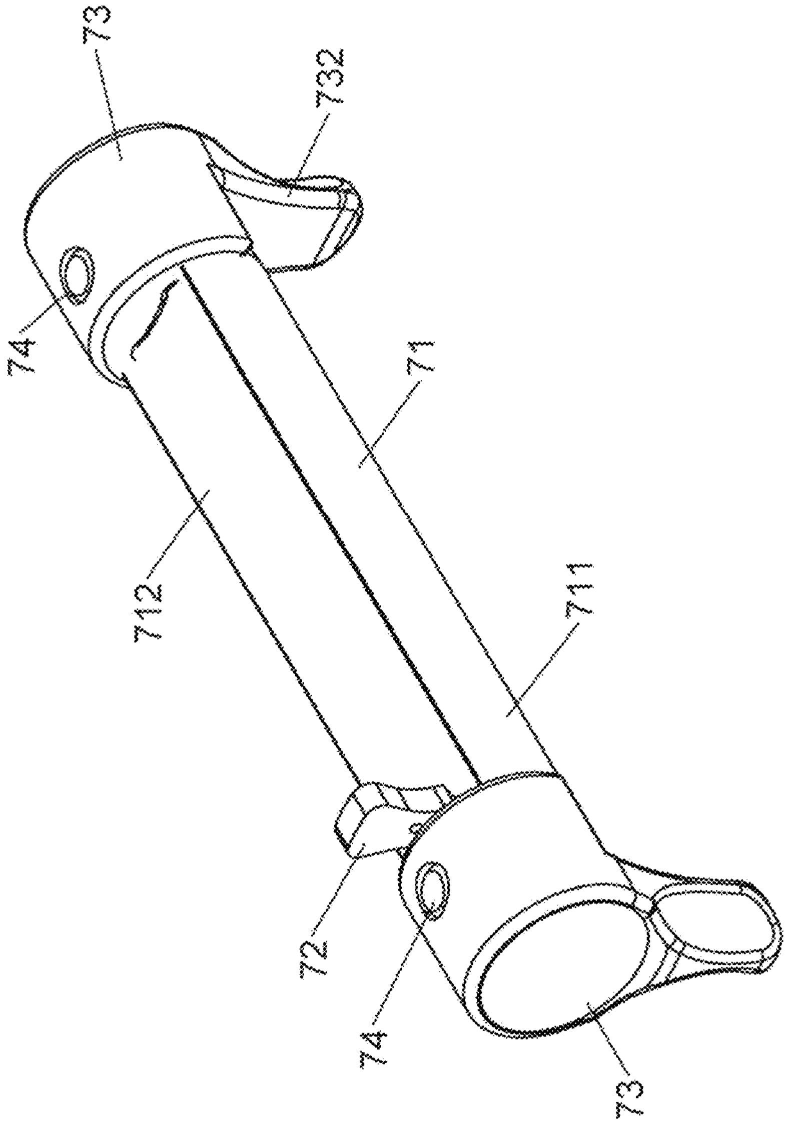
FIG. 16 is a perspective view of a control unit of a tool assembly in accordance with the second preferred embodiment of the present invention.
Figure 17:
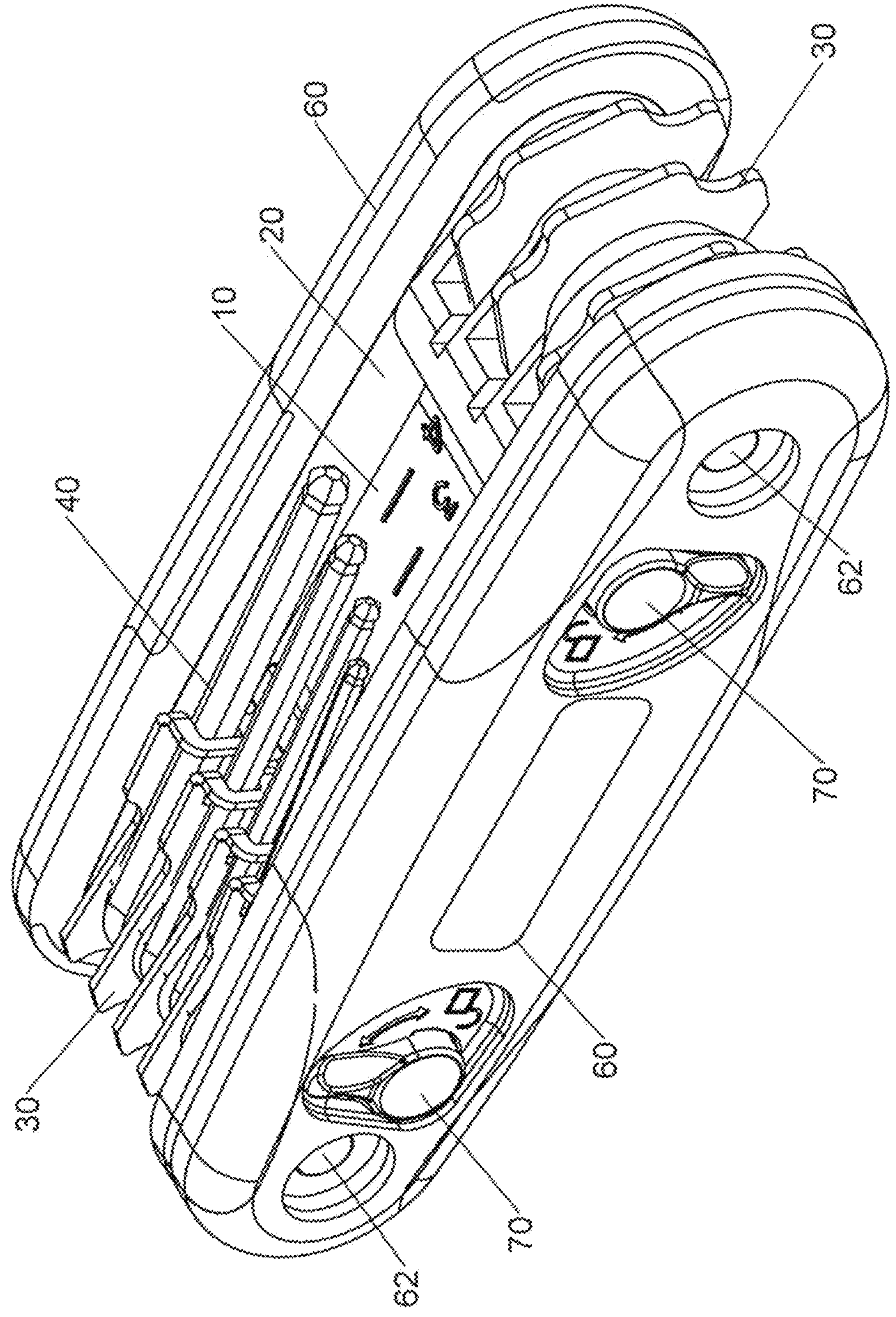
FIG. 17 is a perspective view of the tool assembly in accordance with the second preferred embodiment of the present invention.

Referring to FIGS. 16 and 17 with reference to FIGS. 1-10, each of the first end and the second end of the control lever 71 is provided with the first connecting portion 714 and the first fixed portion 715. Each of the two control units 70 includes two control members 73 and two fixing members 74. The two control members 73 and the two fixing members 74 are mounted on the first end and the second end of the control lever 71. Thus, the switch knobs 732 of the two control members 73 of each of the two control units 70 are located outside of the second body unit 60 and are driven by the user to rotate each of the two control units 70.

Accordingly, the tool assembly of the present invention has the following advantages.

1. Each of the rotational members 30 and each of the hand tools 40 are rotatable in the first body 10. The operation end 42 of each of the hand tools 40 may be folded and stored in the first body 10 and has a locking effect. When the locked state is unlocked, each of the hand tools 40 is rotated so that the operation end 42 of each of the hand tools 40 is exposed from the first body 10 to facilitate the user operating the hand tools 40. Thus, the hand tools 40 are operated, stored, and carried easily and conveniently.

2. Each of the two control units 70 is rotated to control the locked state or the unlocked state. Thus, each of the two control units 70 only needs to provide the second locking portion 711 and the passage 712. The control lever 71 of each of the two control units 70 has the same structure when the hand tools 40 have different specifications and sizes, and when the rotational members 30 have different spacings or intervals. When the too assembly has two control units 70, each of the two control units 70 has the same structure. Thus, it is unnecessary to change the structure of the two control units 70 when one of the hand tools 40 needs to be replaced.

3. Each of the two control units 70 is rotated to control the locked state or the unlocked state. Thus, the control member 73 of each of the two control units 70 protrudes from one of the two second bodies 61 of the second body unit 60 as shown in FIG. 1, so that each of the two control units 70 is driven from one side of the second body unit 60. Alternatively, the two control members 73 of each of the two control units 70 protrude from the two second bodies 61 of the second body unit 60 as shown in FIGS. 16 and 17, so that each of the two control units 70 is driven from two sides of the second body unit 60. In such a manner, each of the two control units 70 is controlled and operated from one side of the second body unit 60 or from two sides of the second body unit 60. In addition, the switch knob 732 is touched and held by the user's finger to facilitate the user manipulating each of the two control units 70.

4. When the control lever 71 is driven by the switch knob 732 to reach the second position or the unlocked state, the second locking portion 711 is unlocked from one of the first locking portions 32, and the passage 712 is moved to align with one of the first locking portions 32, so that the rotational members 30 and the hand tools 40 are rotated relative to the two first pivot portions 11 and are moved to protrude from the receiving spaces 12, to adjust the angle of the hand tools 40 relative to the first body 10. After the switch knob 732 is released from the user, the control lever 71 of each of the two control units 70 is driven by the restoring force of one of the two elastic members 50 to return to the first position or the locked state, and the second locking portion 711 is locked on another one of the first locking portions 32, so that the rotational members 30 and the hand tools 40 are locked on the first body 10 and cannot be rotated relative to the first body 10. Thus, each of the two control units 70 is rotated to control the locked state or the unlocked state easily, quickly, and conveniently.

5. The control lever 71 of each of the two control units 70 is provided with the second locking portion 711 and the passage 712. Thus, when the second locking portion 711 is locked on one of the first locking portions 32, each of the two control units 70 is disposed at the locked state exactly, and when the passage 712 is moved to align with one of the first locking portions 32, each of the two control units 70 is disposed at the unlocked state, so that the rotational members 30 and the hand tools 40 are unlocked and can be rotated freely.

6. Each of the two second bodies 61 is provided with the limit portion 613. Thus, when the two control units 70 are rotated in the two third control grooves 612 respectively to control the locked state or the unlocked state, the limit portion 613 restricts the maximum angle of rotation of each of the two control units 70, to prevent each of the two control units 70 from being rotated excessively. The recess 614 is provided with the markings for indicating the locked state or the unlocked state of the switch knob 732.

7. The first end 51 of each of the two elastic members 50 is pivotally mounted on one of the two first pivoting sections 16, and the second end 52 of each of the two elastic members 50 is pivotally mounted on the second pivoting section 722 to provide a restoring effect to each of the two control units 70. Thus, when the switch knob 732 is released from the user, each of the two control units 70 is returned to the original position automatically by the restoring force of one of the two elastic members 50, so that the rotational members 30 and the hand tools 40 are returned from the unlocked state to the locked state. In such a manner, each of the two elastic members 50 provides an elastically restoring effect to satisfy the operating habits of the user.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A tool assembly comprising:

a first body, two positioning plates, multiple rotational members, multiple hand tools, two elastic members, a second body unit, and two control units;

wherein:

the first body has two first pivot portions provided on two ends thereof;

each of the two first pivot portions has a circular through hole;

each of the two first pivot portions is provided with multiple receiving spaces arranged linearly;

the first body has two first control grooves provided on the two ends thereof;

each of the two first control grooves is a circular through hole;

the two first control grooves are disposed between the two first pivot portions;

each of the two first control grooves has an axis parallel with that of each of the two first pivot portions;

the first body has two projections provided on two sides thereof;

one of the two projections is provided with two breaches and two first pivoting sections;

each of the two first pivoting sections is provided in one of the two breaches;

each of the two positioning plates is a sheet plate;

the two positioning plates are mounted on the two sides of the first body respectively;

the two positioning plates are arranged symmetrically relative to the first body;

each of the two positioning plates has two second pivot portions provided on two ends thereof;

the two second pivot portions align with the two first pivot portions respectively;

each of the two positioning plates has two second control grooves provided on the two ends thereof;

the two second control grooves align with the two first control grooves respectively;

each of the two positioning plates has a middle provided with a first slot mounted on one of the two projections, with the two breaches and the two first pivoting sections protruding from the first slot;

the first slot has an elongate shape with a transverse opening;

each of the rotational members is pivotally mounted in each of the receiving spaces and is rotatable in one of the receiving spaces;

each of the rotational members is provided with a third pivot portion aligning with one of the two first pivot portions and one of the two second pivot portions;

the third pivot portion is a circular hole;

each of the rotational members is provided with multiple first locking portions;

one of the first locking portions aligns with one of the two first control grooves and one of the two second control grooves;

the first locking portions are arranged annularly about an axis of the third pivot portion;

each of the first locking portions is a concave groove;

each of the rotational members has an end provided with a receiving groove;

each of the hand tools is mounted on each of the rotational members;

each of the hand tools and each of the rotational members are pivotally mounted in each of the receiving spaces;

each of the hand tools and each of the rotational members are rotated about one of the two first pivot portions through an angle;

each of the hand tools is provided with a fourth pivot portion aligning with one of the two first pivot portions, one of the two second pivot portions, and the third pivot portion;

each of the hand tools is provided with an operation end extending through and received in the receiving groove, so that each of the hand tools is driven and rotated by each of the rotational members;

each of the two elastic members has a first end and a second end;

the first end of each of the two elastic members is mounted on one of the two first pivoting sections;

the second body unit is mounted outside of the two positioning plates, with each of the two positioning plates being located between the first body and the second body unit;

the second body unit includes two second bodies and two connecting members;

the two second bodies are mounted on the two positioning plates respectively;

each of the two second bodies has two fifth pivot portions provided on two ends thereof;

each of the two fifth pivot portions aligns with one of the two first pivot portions, one of the two second pivot portions, the third pivot portion, and the fourth pivot portion;

each of the two second bodies has two third control grooves provided on the two ends thereof;

the two third control grooves align with the two first control grooves and the two second control grooves respectively;

each of the two third control grooves has an interior provided with a limit portion;

the limit portion is a protruding block;

each of the two third control grooves has a side provided with a recess;

the recess has a dimension more than that of each of the two third control grooves;

each of the two second bodies has a middle provided with a second slot aligning with the first slot;

the second slot is mounted on one of the two projections;

each of the two connecting members extends through one of the two fifth pivot portions, one of the two second pivot portions, one of the two first pivot portions, the third pivot portion, and the fourth pivot portion, so that the first body, the two positioning plates, the rotational members, the hand tools, and the second body unit are assembled;

the two control units are pivotally mounted in the two first control grooves, the two second control grooves, and the two third control grooves respectively;

each of the two control units controls the rotational members and the hand tools to move relative to the first body between a locked state and an unlocked state;

each of the two control units is restricted by the limit portion so that each of the two control units cannot be rotated in one of the two third control grooves through three hundred and sixty degrees;

each of the two control units includes a control lever, a pin, a control member, and a fixing member;

the control lever passes through one of the two third control grooves, one of the two second control grooves, and one of the two first control grooves;

the control lever is rotatable in one of the two third control grooves, with the limit portion restraining a rotation angle of the control lever;

the control lever is provided with a second locking portion locked on one of the first locking portions;

the second locking portion has an arcuate face;

the control lever is provided with a passage allowing passage of the rotational members;

the passage is located opposite to the second locking portion and has a concave face;

the second locking portion and the passage extend in a lengthwise direction of the control lever;

the control lever has a first end provided with a first through hole;

the control lever has a second end provided with a first connecting portion;

the first connecting portion is provided with a first fixed portion;

the pin is assembled with the control lever;

the pin has an end provided with a shank assembled in the first through hole;

the pin is provided with a second pivoting section protruding from the first through hole;

the second end of each of the two elastic members is mounted on the second pivoting section;

the control lever and the pin are rotated so that each of the two elastic members stores a restoring force;

the control member protrudes from the second body unit and is assembled with the control lever;

the control member is provided with a second connecting portion mounted on the first connecting portion;

the control member is provided with a switch knob protruding therefrom;

the switch knob is received in the recess;

the control member is provided with a second fixed portion aligning with the first fixed portion;

when the switch knob is rotated in the recess, the control member is rotated to drive the control lever, and the control lever is rotated in one of the two third control grooves, one of the two second control grooves, and one of the two first control grooves;

the fixing member passes through the second fixed portion and the first fixed portion, so that the control member and the control lever are assembled by the fixing member;

when the control lever is driven by one of the two elastic members to reach a first position or a locked state, the second locking portion restricts one of the first locking portions, so that the rotational members and the hand tools are locked and cannot be rotated;

when the control lever is driven by the switch knob to reach a second position or an unlocked state, the passage is moved to align with and release one of the first locking portions, and the rotational members are allowed to pass the passage, so that the rotational members and the hand tools are unlocked and can be rotated freely; and after the switch knob is released, the control lever is driven by the restoring force of one of the two elastic members and returned to the first position or the locked state.

2. The tool assembly as claimed in claim 1, wherein each of the two first pivoting sections is a cylinder.

3. The tool assembly as claimed in claim 1, wherein each of the rotational members is provided with three first locking portions, the receiving groove has a rectangular shape, each of the rotational members is a sheet plate, and the receiving groove is formed by bending each of the rotational members.

4. The tool assembly as claimed in claim 1, wherein each of the hand tools is a hex wrench having a 9-shaped profile.

5. The tool assembly as claimed in claim 1, wherein each of the two elastic members is a spring and is partially received in one of the two breaches.

6. The tool assembly as claimed in claim 1, wherein the recess is provided with markings for indicating a locked state or an unlocked state.

7. The tool assembly as claimed in claim 1, wherein the second body unit further includes two nuts mounted in the two fifth pivot portions of one of the two second bodies and screwed onto the two connecting members.

8. The tool assembly as claimed in claim 1, wherein:

the first through hole is a circular hole penetrating the control lever;

the first through hole is perpendicular to an axis of the control lever;

the first connecting portion extends a shape of the control lever and has a semi-cylindrical shape; and the first fixed portion is a circular hole and is perpendicular to the axis of the control lever.

9. The tool assembly as claimed in claim 1, wherein:

the shank as a width less than that of the pin;

the second pivoting section is a hole;

the second connecting portion is a semi-circular recess;

the second fixed portion is a through hole connected to the second connecting portion;

the second fixed portion is perpendicular to the second connecting portion; and the fixing member is a circular rod.

10. The tool assembly as claimed in claim 1, wherein:

each of the first end and the second end of the control lever is provided with the first connecting portion and the first fixed portion;

each of the two control units includes two control members and two fixing members;

the two control members and the two fixing members are mounted on the first end and the second end of the control lever;

the switch knobs of the two control members of each of the two control units are located outside of the second body unit and are driven by a user to rotate each of the two control units.

* * * * *